(12) United States Patent
Popov et al.

(10) Patent No.: US 10,755,041 B2
(45) Date of Patent: *Aug. 25, 2020

(54) CONVERSION TOOL FOR XPS AND OPENXPS DOCUMENTS

(71) Applicant: Microsoft Technology Licensing, LLC, Redmond, WA (US)

(72) Inventors: Dimitar Popov, Redmond, WA (US); Herman Widjaja, Sammamish, WA (US); Lucas Brodzinski, Redmond, WA (US); Hristo Ivanov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,517

(22) Filed: Dec. 27, 2018

(65) Prior Publication Data

US 2019/0266229 A1 Aug. 29, 2019

Related U.S. Application Data

(63) Continuation of application No. 14/929,364, filed on Nov. 1, 2015, now Pat. No. 10,204,089, which is a
(Continued)

(51) Int. Cl.
| | |
|---|---|
| *G06F 40/197* | (2020.01) |
| *G06F 40/14* | (2020.01) |
| *G06F 40/114* | (2020.01) |
| *G06F 40/151* | (2020.01) |
| *G06F 40/279* | (2020.01) |

(Continued)

(52) U.S. Cl.
CPC .......... *G06F 40/197* (2020.01); *G06F 40/114* (2020.01); *G06F 40/14* (2020.01); *G06F 40/151* (2020.01); *G06F 40/279* (2020.01);

*G06F 3/1206* (2013.01); *G06F 3/1246* (2013.01); *G06F 3/1247* (2013.01); *G06F 3/1248* (2013.01); *G06F 3/1296* (2013.01); *G06F 3/1297* (2013.01); *G06F 16/80* (2019.01); *G06F 16/9027* (2019.01); *G06F 40/103* (2020.01); *G06F 40/109* (2020.01);
(Continued)

(58) Field of Classification Search
CPC combination set(s) only.
See application file for complete search history.

(56) References Cited

U.S. PATENT DOCUMENTS

| | | | |
|---|---|---|---|
| 2008/0178067 A1* | 7/2008 | Lahnnan | G06F 3/121 715/200 |
| 2009/0282389 A1* | 11/2009 | Slone | G06F 11/3684 717/124 |
| 2010/0131486 A1* | 5/2010 | Widjaja | G06F 3/1203 707/708 |

OTHER PUBLICATIONS

"Summons to Attend Oral Proceedings Issued in European Patent Application No. 11869309.2", dated Sep. 23, 2019, 5 Pages.
(Continued)

*Primary Examiner* — Quoc A Tran
(74) *Attorney, Agent, or Firm* — Newport IP, LLC; Mike R. Cicero (57) ABSTRACT

A conversion tool enables XPS documents to be automatically converted into the Open XPS format and for Open XPS-formatted documents to be automatically converted into the XPS format. The conversion tool may convert content types, package-level relationships, part-level attributes, and image parts into a format supported by either document format.

20 Claims, 9 Drawing Sheets

Related U.S. Application Data continuation of application No. 13/178,514, filed on Jul. 8, 2011, now Pat. No. 9,183,186.

(51) Int. Cl.
| | |
|---|---|
| *G06F 3/12* | (2006.01) |
| *H04N 1/00* | (2006.01) |
| *G06F 16/80* | (2019.01) |
| *G06F 16/901* | (2019.01) |
| *G06F 40/103* | (2020.01) |
| *G06F 40/109* | (2020.01) |
| *G06F 40/166* | (2020.01) |
| *G06F 40/174* | (2020.01) |

(52) U.S. Cl.
CPC .......... *G06F 40/166* (2020.01); *G06F 40/174* (2020.01); *H04N 1/00204* (2013.01)

(56) References Cited

OTHER PUBLICATIONS

Summons to Attend Oral Proceedings Issued in European Patent Application No. 11869309.2, dated Nov. 13, 2019, 6 Pages.

* cited by examiner

CONVERSION TOOL FOR XPS AND OPENXPS DOCUMENTS

CROSS-REFERENCE TO RELATED APPLICATIONS

This application is a continuation of Ser. No. 14/929,364, filed on Nov. 1, 2015, entitled "CONVERSION TOOL FOR XPS AND OPENXPS DOCUMENTS", which is a continuation of Ser. No. 13/178,514, filed on Jul. 8, 2011, entitled "CONVERSION TOOL FOR XPS AND OPENXPS DOCUMENTS", the entirety of which are incorporated herein by reference.

BACKGROUND

XML Paper Specification (XPS) is a paginated document format developed by Microsoft that specifies the content and appearance of an electronic document. Open XML Paper Specification (OpenXPS) is a paginated document format that is based on XPS but which differs in some respects from the format used in XPS. OpenXPS is a standard adopted by the European Computer Manufacturers Association (ECMA) as ECMA-388. The OpenXPS standard requires conformance to the schema defining the OpenXPS format and the XPS specification requires conformance to the schema defining the XPS format. Due to the differences between the two formats, it may not be possible for XPS and OpenXPS documents to be used interchangeably.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An XPS document is composed of parts and relationships. A part is a data stream similar to a file in a file system. A relationship is an association between one part and another part or a resource (e.g., font). An XPS document uses a markup language (e.g., XML, XAML) to describe a part and a relationship. The XPS Specification describes the schema that defines the syntax of the markup language. The syntax defines the configuration of elements, attributes and values used in describing a part and a relationship.

An XPS document adheres to the schema described in the XML Paper Specification version 1.0 (XPS Specification) and an OpenXPS adheres to the schema described in the OpenXPS Standard. Although the two document formats are similar, there are differences which prevent them from being used interchangeably. A conversion tool is provided which recognizes the differences in the schema of the XPS Specification and the schema of the OpenXPS Standard and automatically converts a document formatted in accordance with one format into a document adhering to the requirements of the other format.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Various embodiments are directed to a system for converting an XPS document into an OpenXPS document and for converting an OpenXPS document into an XPS document. An XPS document adheres to the XML Paper Specification version 1.0 (XPS Specification), currently found at http://www.microsoft.com/xps, and which is hereby incorporated by reference. The OpenXPS standard adheres to ECMA-0388 (OpenXPS Standard), currently found at http://www.ecma-international.org/publications/standards/Ecma-388.htm, which is hereby incorporated by reference. An XPS document should adhere to the schema set forth in the XPS Specification and an OpenXPS document should adhere to the schema set forth in the OpenXPS Standard. Although the two document formats are similar, the differences prevent them from being used interchangeably. The technology described herein recognizes the differences in the requirements of the XPS Specification and the OpenXPS Standard and automatically converts the differences found in one format to match the requirements needed to comply with the other format.

XPS and OpenXPS documents utilize the packaging requirements set forth in the Open Packaging Convention (OPC) standard which has been adopted as ECMA-376 (http://www.ecma-international.org/publications/standards/Ecma-388.htm) which is hereby incorporated by reference and ISO/IEC 29500:2008 (http://standards.iso.org). The OPC packaging requirements specify the structure of both an XPS and OpenXPS document. As such, the conversion tool does not modify the OPC packaging requirements.

Figure 1:
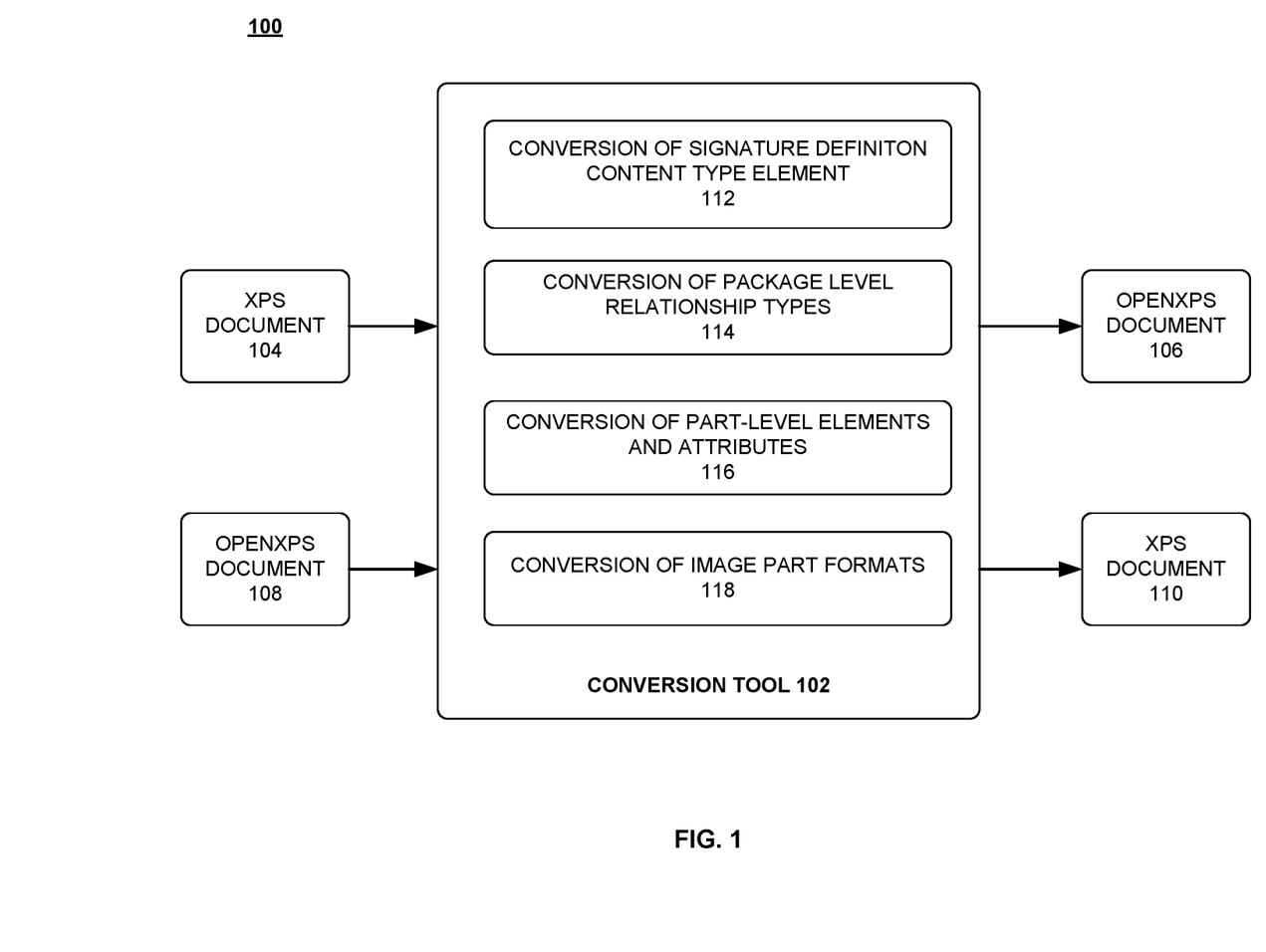
FIG. 1 illustrates an exemplary system for converting between XPS and OpenXPS documents.

Referring to FIG. 1, there is shown a system 100 having a conversion tool 102 that accepts an XPS document 104 and creates a corresponding OpenXPS document 106 having modifications or conversions made to adhere to the OpenXPS Standard. Likewise, the conversion tool 102 accepts an OpenXPS document 108 and creates a corresponding XPS document 110 having conversions made to adhere to the XPS Specification. The conversion tool 102 may perform conversions to the signature definition content type 112, to package-level relationship types 114, to part-level elements and attributes 116, and to image formats 118. These conversions are discussed in more detail below. Attention now turns to an overview of XPS and OpenXPS documents.

XPS and OpenXPS Documents

An XPS and OpenXPS document are a package containing the data and resources needed to print and render an electronic document. The data may consist of text and/or binary files that define the layout of a document, the visual appearance of each page of a document, and the content included in the document. The resources may consist of files used to distribute, render, print, and process the documents such as fonts, style definitions, bit-mapped images, color profiles, remote resource dictionaries, etc.

An XPS and OpenXPS document are each configured into parts and relationships. Each item in the package is considered a part. A part may be a data stream similar to a file in a file system. Parts may be XML files, XAML files, JPEG files, etc. The XPS Specification and the OpenXPS Standard each defines a schema defining the organization and structure of the parts and when parts are needed for a particular type of document.

Each part in a package is defined with a unique part name and a content type. A part name contains a uniform resource identifier (URI) that may be used to access the part within the package. The URI can be relative to the root of the package (i.e., absolute URI) or relative to the placement of the part within the package (i.e., relative URI).

The content type describes the type of content in a part. The content type may use the Multipurpose Internet Mail Extensions (MIME) content classifications to describe the nature of the content in the part. The content type may describe the type of data (e.g., image, audio, video, etc.) and the format of the data (e.g., xml, png, tiff, jpeg, etc.).

A relationship defines an association between one part to another part or between one part and an external resource. There are package-level relationships that define an association between a package and a part or a package and an external resource. There are also part-level relationships that define an association between a part and another part or a part and an external resource.

The XPS Specification and the OpenXPS Standard use a common logical representation of a document. A FixedDocumentSequence part describes a sequence of documents. Each FixedDocumentSequence part may reference FixedDocument parts that represent the pages of a document. Each page of a document is referred to as a FixedPage part. Each FixedPage part contains the text markup and layout of a page which may reference images, fonts, and other resources used in the page. The resources referred to in a page are stored outside of the part so that they may be shared by other pages.

The XPS Specification uses a markup language (e.g., XML, XAML) to describe a part. The markup language is based on a schema that uses elements, attributes, and namespaces. The schema specifies the syntax, structure, and configuration of an XPS document. Each part may have a different schema. Certain elements and attributes in the XPS and OpenXPS schema are required while others are optional. The schema describing an XPS document differs from the schema describing an OpenXPS document.

Figure 2:
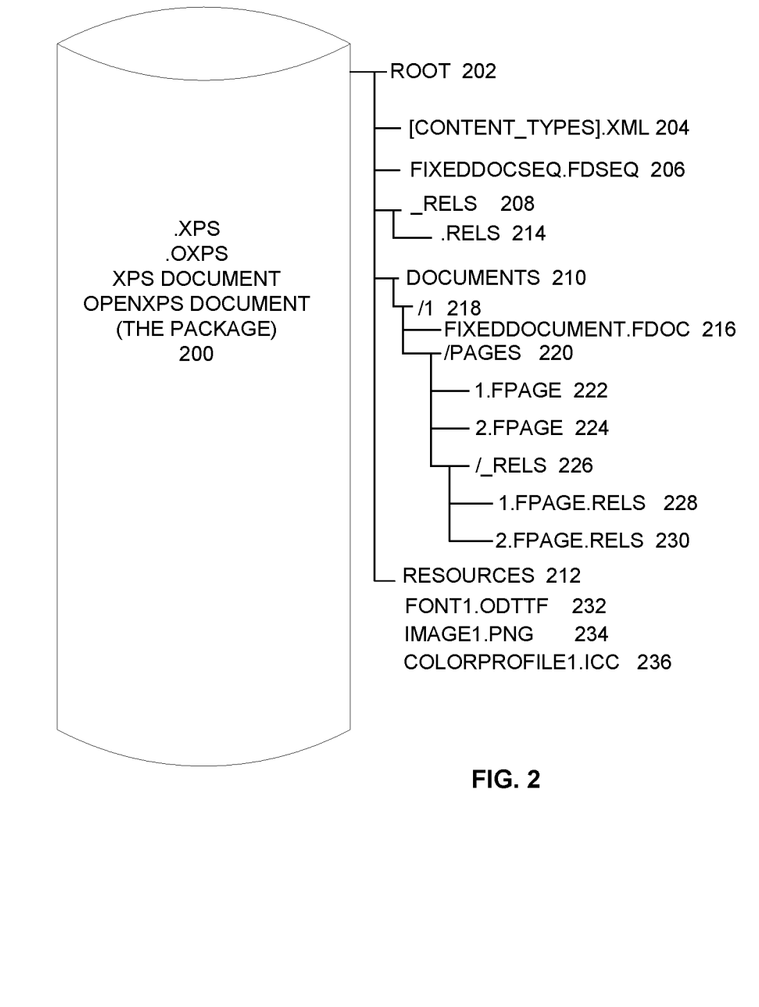
FIG. 2 illustrates an exemplary diagram of a physical layout of an XPS and OpenXPS document.

FIG. 2 illustrates a block diagram of the physical structure of an XPS or OpenXPS document 200 which is also referred to as the package. An XPS or OpenXPS document has a hierarchical structure of folders and files. At the root level 202, there may be two parts or files: [Content Types].xml 204; and the FixedDocumentSequence.fdseq 206. At the root level, there may be also three folders: rels 208; Documents 210; and Resources 212.

The [Content Types].xml part 204 contains a list of all the content types associated with each part. The content type describes the type of content in a part and uses the MIME types and extensions to describe the content. The FixedDocumentSequence.fdseq part 206 lists all the documents in the package.

The folder rels 208 stores the file rels.rels 214 which lists all the package-level relationships. The folder Documents 210 is a hierarchial structure containing all the FixedPage parts in a document and the relationship parts associated with each FixedPage. The Documents folder 210 in FIG. 2 has one document (e.g., FixedDocument.fdoc 216), which is stored in the folder/1 218, and has two pages, 1.fpage 222 and 2.fpage 224, stored in the folder/pages 220. The part/Documents/1/Pages/_rels/1.fpage.rels 228 contains the relationships associated with the FixedPage part 1.fpage 222 and the part/Documents/1/Pages/_rels/1.fpage.rels contains the relationships associated with the FixedPage part 2.fpage. The folder Resources 212 contains a font part, font1.odtff 232, an image part, image1.png 234, and an ICC color profile, colorprofile1.icc, that may be used to print the two pages of the document.

Although the package 200 shown in FIG. 2 has a limited number of folder and files in a certain configuration, it should be appreciated that the package 200 can include more or less folders and files in alternate configurations.

Attention now turns to a discussion of the various embodiments of the operations used in the system with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

XPS and OpenXPS Conversion

Figure 3:
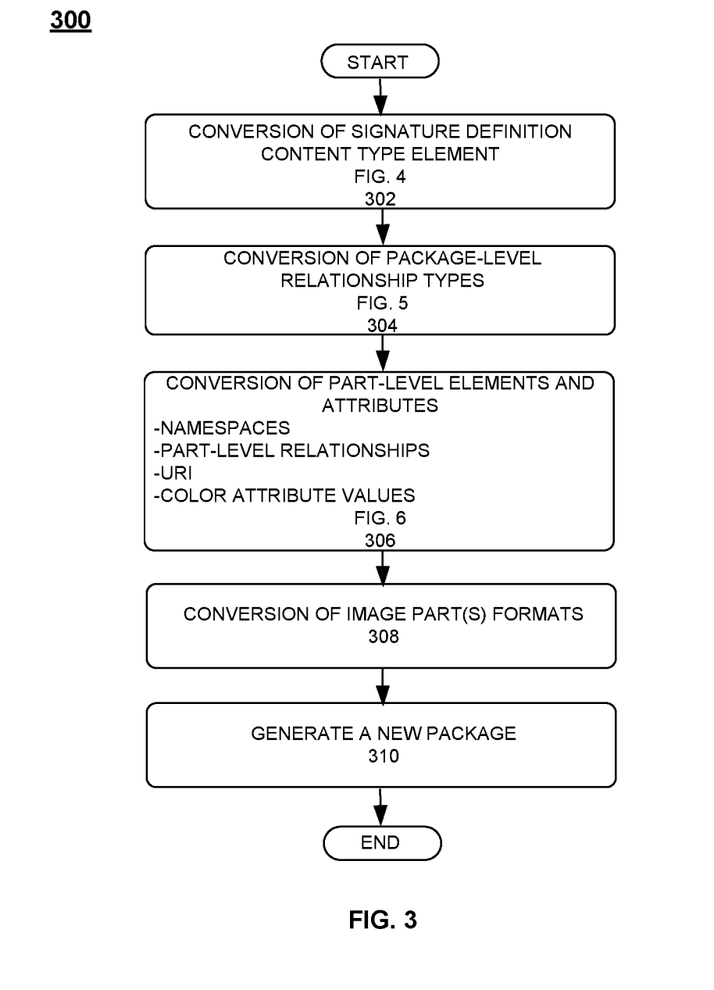
FIG. 3 is a flow chart illustrating an exemplary method for converting between XPS and OpenXPS documents.

Referring to FIG. 3, there is shown an exemplary method 300 for converting an XPS document into an OpenXPS document and for converting an OpenXPS document into an XPS document. The method starts by converting a signature definition content-type element in one format into the other format (block 302), converting package-level relationship types in one format into the other format (block 304), converting part-level elements and attributes of certain parts from one format into the other format (block 306), converting certain image parts from one image format into another image format (block 308), and generating a new package in the new format (block 310).

Conversion of SignatureDefintion Content Type

Figure 4:
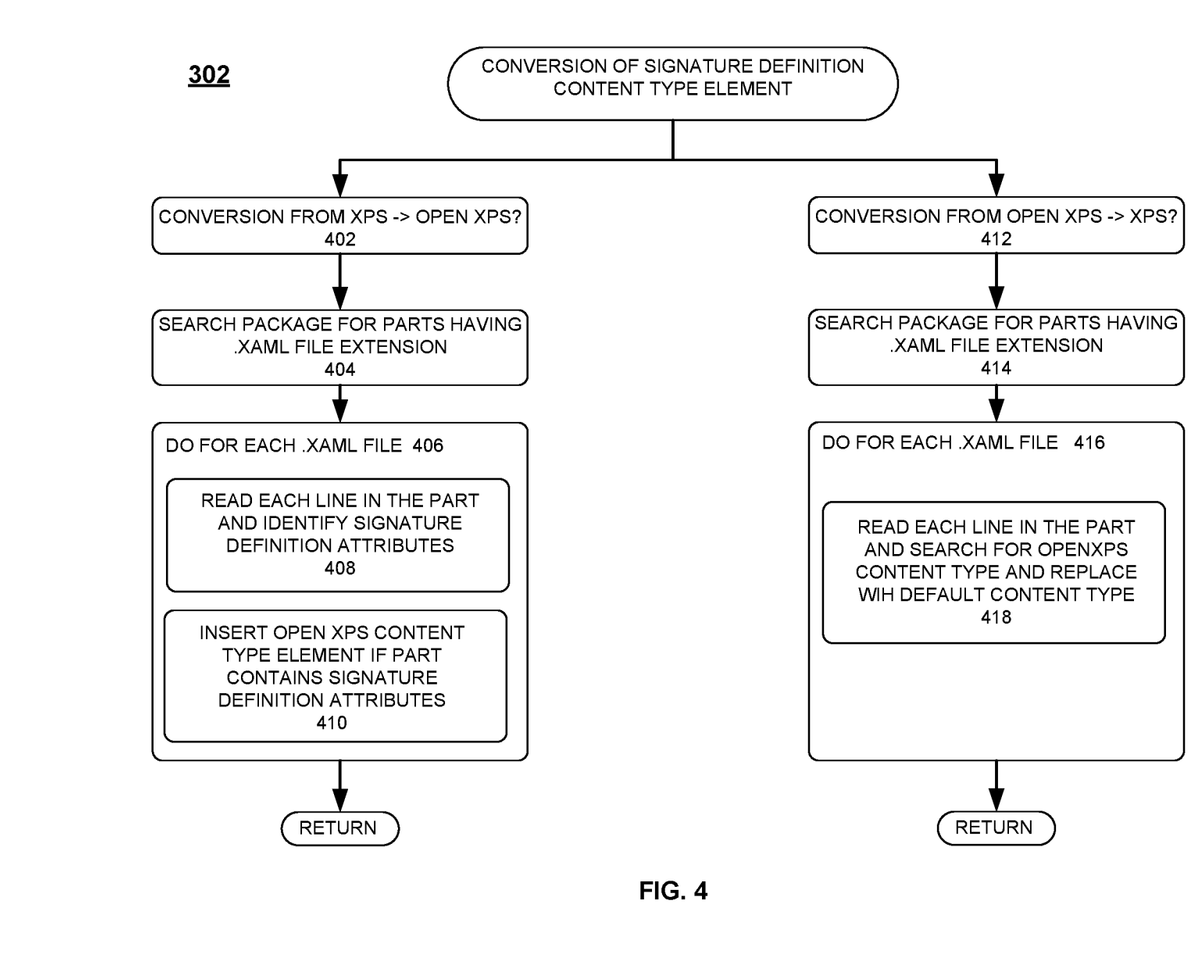
FIG. 4 is a flow chart illustrating an exemplary method for converting content types.

FIG. 4 illustrates a flow chart of an exemplary method for converting the Signature Definition part's content type to the converted format.

XPS supports the capability of digitally signing an XPS document as a means to provide proof of authenticity to an XPS document. A SignatureDefinition part is used to indicate specific information used in the digital signature process such as the signing parties, co-signature requirements, and so forth.

An exemplary XML markup for a SignatureDefinitions part is shown in Table 1. The xml namespace is defined by the SignatureDefinitions xmlns element (e.g., SignatureDefinitions xmlns="http://schemas.microsoft.com/xps/2011/01/signature-definitions"). The signer of the XPS document is identified in the Signer Name attribute and the SpotID attribute is a globally unique identifier for the signature spot (e.g., SignatureDefinition SignerName="Jane Doe" SpotID="1234"). The Spot Location element indicates the page on which the signature spot may be displayed (e.g., PageURT="/Documents/2/Pages/3.fpage") and the placement of the signature spot on the page (e.g., StartX="0.0", StartY="0.0")

The Intent element specifies the intention of the signatory when digitally signing the document (e.g., <Intent> I have read the conditions, understand them, and agree to them <Intent>), the SignBy element specifies the data and time by which the signatory is to sign the document (e.g., <SignBy> Aug. 3, 2011</SignBy>), and the SigningLocation element specifies the legal location where the document is to be signed (<SigningLocation> New York, N.Y. </SigningLocation>).

TABLE 1

```
<SignatureDefinitions
xmlns="http://schemas.microsoft.com/xps/2011/01/signature-
definitions">
    <SignatureDefinition SignerName="Jane Doe" SpotID="1234">
        <Spot Location
            PageURI="/Documents/2/Pages/3.fpage"
            StartX="0.0"
            StartY="0.0" />
        <Intent> I have read the conditions, understand them, and agree
        to them <Intent>
        <SignBy>August 3, 2011</SignBy>
        <SigningLocation>New York, NY </Signing Location>
    <SignatureDefinition>
</SignatureDefinitions>
```

XPS uses a default content type for the Signature Definition part. In OpenXPS, a Signature Definition part requires a specific content type which differs from the default content type used in XPS. In converting an XPS document to an OpenXPS document, the OpenXPS content type is inserted into the Signature Definition part. When converting an OpenXPS document to an XPS document, the content type for the Signature Definition part is deleted and replaced with the default content type.

Referring to FIG. 4, in the case of converting from an XPS document to an OpenXPS document (block 402), the conversion tool 102 searches for parts having an .xaml (Extensible Application Markup Language) file extension (block 404). Xaml is an XML-based language having additional elements that provide the capabilities to create and animate user interface objects. Parts having an .xaml file extension that are digitally signed use a default ContentType, such as <Default Content Type="application/xml" Extension="xaml"/>. This default content type does not adequately identify the contents of a Signature Definitions part as being a Signature Definitions part. By contrast, OpenXPS requires that a Signature Definitions part have a Content Type element that definitively indicates that the part is a Signature Definitions part.

In order to determine if a part having a .xaml file extension is a Signature Definition part, the conversion tool 102 reads each .xaml part (block 406) and scans for Signature Definition indicators, such as the elements and attributes that are within the SignatureDefinition part schema described in Table 1 (block 408). Some of these elements and attributes are optional while others are required so the schema employed in an .xaml part may differ from that shown in Table 1. When the conversion tool 102 finds at least one of the elements and/or attributes associated with a SignatureDefinition part schema (block 408), the conversion tool may replace the default Content Type with the required OpenXPS Content Type, which may have the form, <Content Type="application/vnd.ms-package.xps-signaturedefinitions+xml"/> (block 410).

In the case of converting from an OpenXPS document to an XPS document (block 412), the conversion tool 102 searches the package for parts having an .xaml file extension (block 414). Each such part is read for an OpenXPS Content Type element having a value that matches the string, "application/vnd.ms-package.xps-signaturedefinitions+xml". The OpenXPS Content Type element is deleted and replaced with the default Content Type which may be constructed in the form <Default Content Type="application/xml" Extension="xaml"/>.

Conversion of Package-Level Relationship Types

Figure 5:
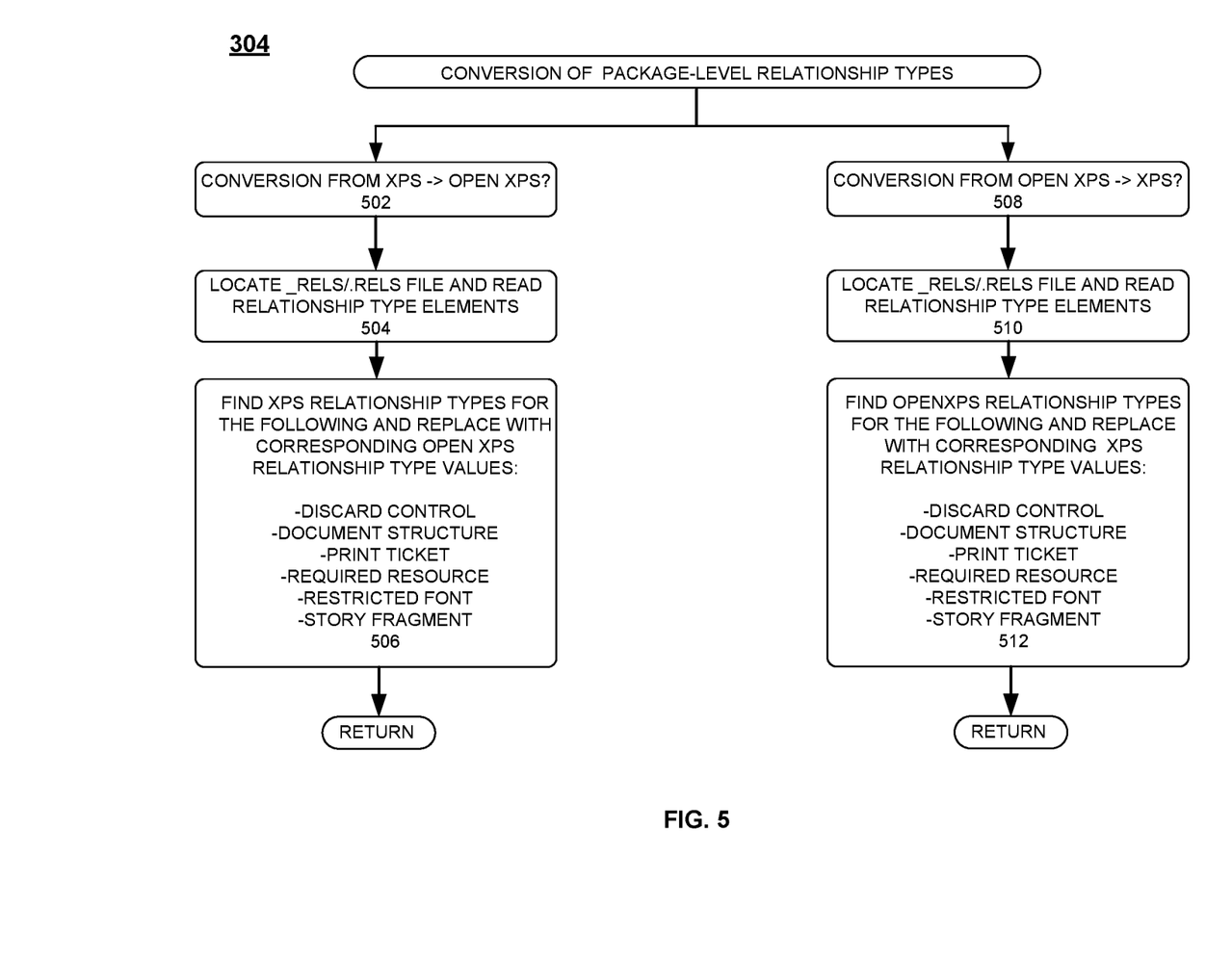
FIG. 5 is a flow chart illustrating an exemplary method for converting package-level relationship types.

FIG. 5 illustrates a flow chart of an exemplary method for converting XPS-formatted package-level relationship types to a corresponding OpenXPS-formatted package-level relationship type and for converting OpenXPS-formatted package-level relationship types to a corresponding XPS-formatted package-level relationship type.

A relationship defines an association between one part to another part or between one part and an external resource. There are package-level relationships that identify relationships between the package and parts within the package and relationships between the package and external resources. A relationship element is used to configure a relationship between a package and a part. The relationship element may be formatted in XPS as shown in Table 2 below.

TABLE 2

```
<Relationships xmlns =
"http://schemas.openxmlformats.org/package/2006/relationships">
<Relationship
    Type = "http://schemas.microsoft.com/xps/2005/06/restricted-font"
    Target = "/Resources/1298DD23234D443D2.ODTTF" Id="A1"/ >
</Relationships>
```

The exemplary relationship shown in Table 2 associates the package with a restricted font part. A restricted font is one that cannot be modified or have any edits made to certain elements of the font. The relationship associates a package referred to by the namespace, http://schemas.xmlformats.org/package/2006/relationships, with a part referred to as A1, which is identified by the Id attribute (e.g., Id="A1"). The Type attribute identifies the namespace of the restricted font (e.g., http://schemas.microsoft.com/xps/2005/06/restricted-font) and the Target attribute identifies the local location of the font within the package.

Referring to FIG. 5, in the case of converting an XPS document to an OpenXPS document (block 502), the conversion tool 102, reads the package-level relationships which are stored in the part named _rels/.rels (block 504). At the root level, there is a folder rels that stores the part named _rels/.rels that contains the package-level relationships. The conversion tool 102 reads the _rels/.rels part (block 504) and scans the values of the Type attribute associated with a Relationship element. In particular, the conversion tool 102 searches for the values for an XPS Relationship Type element and replaces them with the corresponding value for the same OpenXPS Relationship Type element shown in Table 3 (block 506). For example, if the conversion tool 102 finds the following markup <Relationship Type="http://schemas.microsoft.com/xps/2005/06/restricted-font"

the conversion tool 102 may convert the value of the Relationship Type element to the following:

<Relationship Type="http://schemas.openxps.org/oxps/v1.0/restricted-font".

This replacement may be performed for all the XPS Relationship Type elements shown in Table 3.

TABLE 3

| Part | XPS Relationship Type | OpenXPS Relationship Type |
|---|---|---|
| Digital Signature Definitions | http://schemas.microsoft.com/xps/2005/06/signature-definitions | http://schemas.openxps.org/oxps/v1.0/signature-definitions |
| Discard Control | http://schemas.microsoft.com/xps/2005/06/discard-control | http://schemas.openxps.org/oxps/v1.0/discard-control |
| Document Structure | http://schemas.microsoft.com/xps/2005/06/documentstructure | http://schemas.openxps.org/oxps/v1.0/documentstructure |
| Print Ticket | http://schemas.microsoft.com/xps/2005/06/printticket | http://schemas.openxps.org/oxps/v1.0/printticket |
| Required Resource | http://schemas.microsoft.com/xps/2005/06/required-resource | http://schemas.openxps.org/oxps/v1.0/required-resource |
| Restricted Font | http://schemas.microsoft.com/xps/2005/06/restricted-font | http://schemas.openxps.org/oxps/v1.0/restricted-font |
| Story Fragments | http://schemas.microsoft.com/xps/2005/06/storyfragments | http://schemas.openxps.org/oxps/v1.0/storyfragments |

In the case of converting an OpenXPS document to an XPS document (block 508), the conversion tool 102 reads the package-level relationships found in the part named _rels/.rels (block 510). The conversion tool 102 reads the values of the Relationship Type elements. In particular, the conversion tool 102 searches for each of the values of OpenXPS Relationship Type elements shown in Table 3 and replaces them with the corresponding values of the same XPS Relationship Type element shown in Table 3 (block 512). For example, if the conversion tool 102 finds the following markup <Relationship Type="http://schemas.openxps.org/oxps/v1.0/restricted-font"

the conversion tool 102 may convert the value of the Relationship Type element to the following markup <Relationship Type="http://schemas.microsoft.com/xps/2005/06/restricted-font". This replacement may be performed for all the OpenXPS Relationship Type elements shown in Table 3.

At the package-level, these conversions may be applied to the following parts: Digital Signature Definitions; Discard-Control; DocumentStructure; PrintTicket; Required Resource; Restricted Font; and StoryFragments.

Conversion of Part-Level Elements and Attributes

Figure 6:
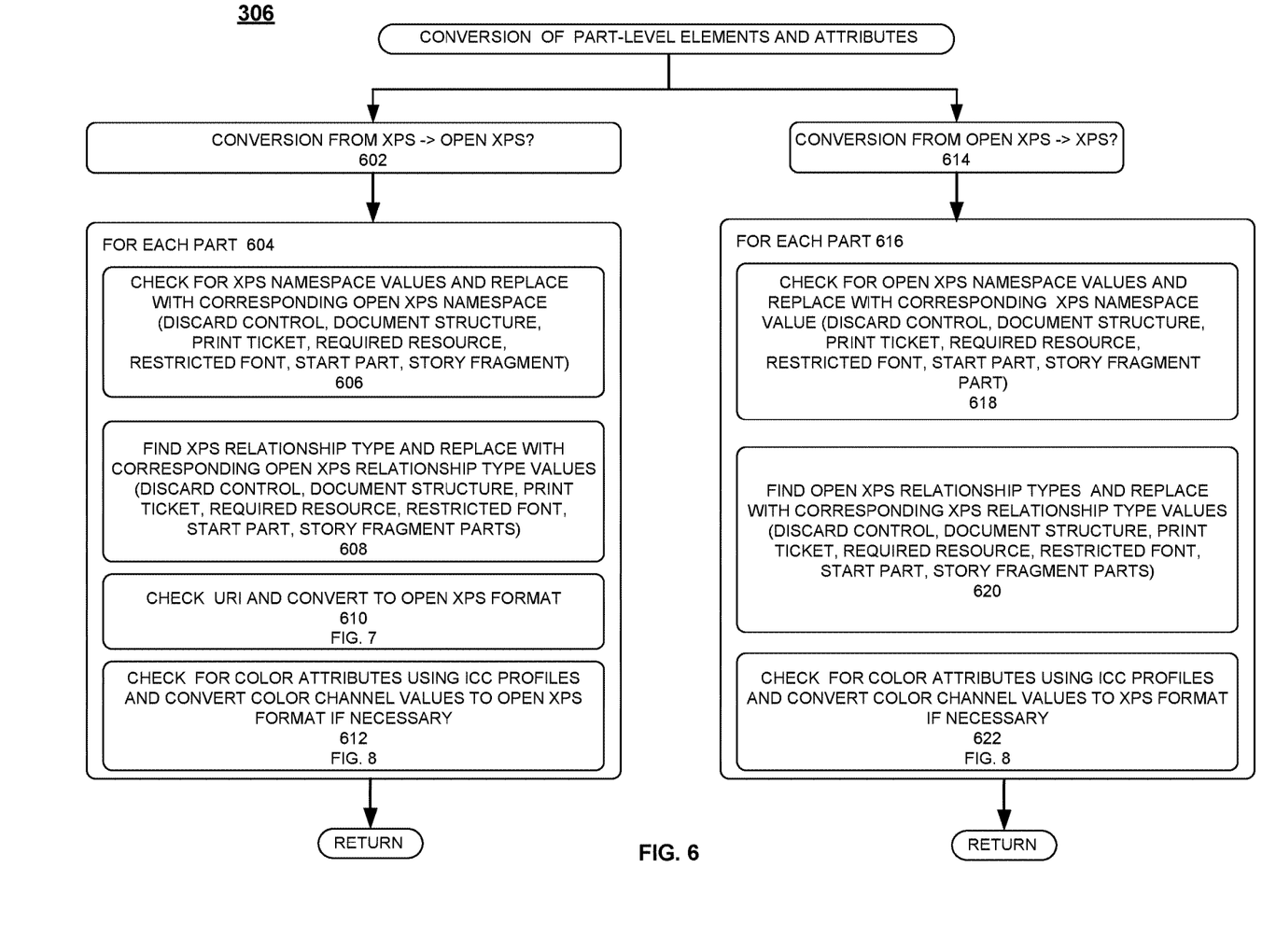
FIG. 6 is a flow chart illustrating an exemplary method for converting part-level elements and attributes.

FIG. 6 illustrates a flow chart of an exemplary method for converting certain XPS-formatted part-level elements and attributes to an OpenXPS-formatted equivalent and for converting certain OpenXPS-formatted part-level elements and attributes to an XPS-formatted equivalent. More particularly, the method converts XPS-formatted namespaces to a corresponding OpenXPS-formatted namespace, XPS-formatted relationship types to a corresponding OpenXPS-formatted relationship type, XPS-formatted URIs to a corresponding OpenXPS-formatted URI, and XPS-formatted color channel values to a corresponding OpenXPS-formatted color channel value. Attention now turns to a description of each of these conversions.

A namespace is a collection of names which are used as elements and attributes in an XML document. An XML namespace is identified by a URI reference. The namespaces used in certain parts in an XPS document may differ from the namespaces used in the same part of an OpenXPS document. As such, the namespaces for each of the parts that differ need to be converted to the proper namespace. The parts having namespaces that differ in both the XPS and OpenXPS formats are found in Table 4. For each part listed in Table 4, the conversion tool 102 replaces each of the XPS-formatted namespaces with the corresponding OpenXPS-formatted namespace shown in Table 4.

TABLE 4

| Part | XPS Namespace | OpenXPS Namespace |
|---|---|---|
| Discard Control | <Discard Control xmlns = http://schemas.microsoft.com/xps/2005/06/discard-control/> | <Discard Control xmlns = http://schemas.openxps.org/oxps/v1.0/discard-control/> |
| Document Structure | <Document Strucuture xmlns = http://schemas.microsoft.com/xps/2005/06/documentstructure/> | <Document Strucuture xmlns = http://schemas.openxps.org/oxps/v1.0/documentstructure/> |
| Fixed Document | <FixedDocument xmlns = http://schemas.microsoft.com/xps/2005/06//> | <FixedDocument xmlns = http://schemas.openxps.org/oxps/v1.0//> |
| FixedDocument Sequence | <FixedDocumentSequence xmlns = http://schemas.microsoft.com/xps/2005/06//> | <FixedDocumentSequence xmlns = http://schemas.openxps.org/oxps/v1.0//> |
| Fixed Page | <FixedPage xmlns = http://schemas.microsoft.com/xps/2005/06//> | <FixedPage xmlns = http://schemas.openxps.org/oxps/v1.0//> |
| Resource Dictionary | <Resource Dictionay xmlns = http://schemas.microsoft.com/xps/2005/06/resourcedictionary-key/> | <Resource Dictionary xmlns = http://schemas.openxps.org/oxps/v1.0/resourcedictionary-key/> |

TABLE 4-continued

| Part | XPS Namespace | OpenXPS Namespace |
| --- | --- | --- |
| Signature Definitions | <Signature Defintions xmlns = http://schemas.microsoft.com/xps/2005/06/signature-definitions/> | <Signature Definitions xmlns = http://schemas.openxps.org/oxps/v1.0/signature-definitions/> |
| Story Fragments | <Story Fragments xmlns = http://schemas.microsoft.com/xps/2005/06/documentstructure/> | <Story Fragments xmlns = http://schemas.openxps.org/oxps/v1.0/documentstructure/> |

Each part has a corresponding relationship part that identifies the associations between the part and other parts or external resources. The relationship part has a filename that is constructed with elements from the part's part name and has a file extension of .rels. For certain parts, the URI indicated in the Relationship Type element is different in the XPS Specification from the URI specified in the OpenXPS Standard. For these certain parts, the conversion tool 102 converts the XPS-formatted URI of a Relationship Type element to a corresponding OpenXPS-formatted URI and converts an OpenXPS-formatted URI of a Relationship Type element to a corresponding XPS-formatted URI. The parts requiring this conversion are the Digital Signature Definitions part, the Discard Control part, the Document Structure part, the PrintTicket part, the Required Resource part, the Restricted Font part, the StartPart part, and the StoryFragments part. The parts requiring these conversions are listed in Table 3 along with the XPS-formatted values and the OpenXPS-formatted values.

A uniform resource identifier (URI) is used to access a part. An absolute URI is an absolute address or absolute file path to the location of a part. A relative URI is configured in accordance with RPC 3986, Uniform Resource Identifier (URI) Generic Syntax (http://tools.ietf.org/html/rfc3986). A relative URI can have an absolute file path that starts with the forward slash character ("/") or has a file path that is relative to the root of the package using the package root as the base URI. XPS supports both absolute and relative URIs. OpenXPS requires relative URIs to be used for FixedDocument, Fixed Page, Font, and Image parts. As such, when converting from an XPS document to an OpenXPS document, the conversion tool 102 converts each absolute URI into a relative URI for the <Document Reference> element in a FixedDocument part, for the <Page Content> element in a Fixed Page part, for the <Glyphs> element in a Font part, and an <ImageBrush> element of an Image part.

Various elements may use a Color attribute to identify a particular color in a well-defined color space. The Color attribute may be used in an element to print or render a particular image, object, or text string. Examples of such elements are the <Solid Color Brush> element and the <Gradient Stop> element. The <Solid Color Brush> element may be used to paint an area with a solid color and the <Gradient Stop> element may be used to paint an area with a gradient color. The syntax of the Color attribute may be configured as follows:

<Color="ContextColor Profile URI channel values">, where the text string "ContextColor" indicates that a particular color is being specified, the text string "Profile URI" is the URI of the color profile being used, and the text string "channel values" identify the intensity levels for each channel in the color profile. Color profiles are parts having a file extension of .icc and may be stored in the Resources folder of the package.

A color channel or channel refers to a component of a color space. There are several well-known color spaces, such as RGB (Red, Green, Blue), CMYK (Cyan, Magenta, Yellow, Black), HLS (Hue, Luninance, Saturation), HSV (Hue, Saturation, Value), and Grayscale. Each color space is associated with a certain number of components, each component being referred to as a channel. For example, RGB is associated with 3 components or channels: red; green; and blue. As such, RGB is referred to as a 3-channel color space. Each channel has a value indicating an intensity level for that channel. For example, the channel values associated with the 3-channel RGB color space may be represented as 1, 2, 5, where the channel value for red is 1, the channel value for green is 2, and the channel value for blue is 5.

In the XPS Specification, the syntax of the Color attribute specifies a minimum of 3 channel values. In the case of a color space that uses less than 3 channels, such as Grayscale, zeros are added in the channel value text string to conform to this requirement. For example, in XPS the following Color attribute <Color="ContextColor Grayscale.icc 0.5, 0, 0"> indicates that a grayscale coloring is used which is a one channel color space and where the intensity level is 0.5 for the channel. The additional zeros represent fillers not associated with any channel.

In the OpenXPS Specification, the syntax of the Color attribute requires that there are no zero fillers used as color channel values. Instead, each color channel value is associated with an actual channel. In order to comply with the syntax requirements of both formats, the conversion tool 102 scans the channel values specified in each Color attribute. When converting from an XPS document to an OpenXPS document, if zeros are used as a channel value, the conversion tool determines whether the zero is an actual channel value or a filler. The conversion tool 102 converts the channel values to the appropriate format if the zero values are fillers. When converting from an OpenXPS document to an XPS document, if there are less than 3 channel values in the Color attribute, additional zeros are appended to the end of the channel value string accordingly.

Attention now turns to a description of the operation of each of these conversions. Referring back to FIG. 6, when converting from an XPS document to an OpenXPS document (block 602), the conversion tool 102 locates and opens each part in the package (block 604). The conversion tool 102 reads each line in each part and looks for the XPS-formatted namespace elements listed in Table 4 and replaces them with the corresponding OpenXPS-formatted namespace element listed in Table 4 (block 606). This conversion is performed for at least the Discard Control, Document Structure, Fixed Document, Fixed Document Sequence, Fixed Page, Resource Dictionary, Signature Definitions, and Story Fragments parts.

Next, for each part listed in Table 3, the conversion tool 102 locates the corresponding relationship part (e.g., [part-name].rels file) and replaces the Relationship Type elements with the Relationship Type element found in Table 3 (block 608).

Figure 7:
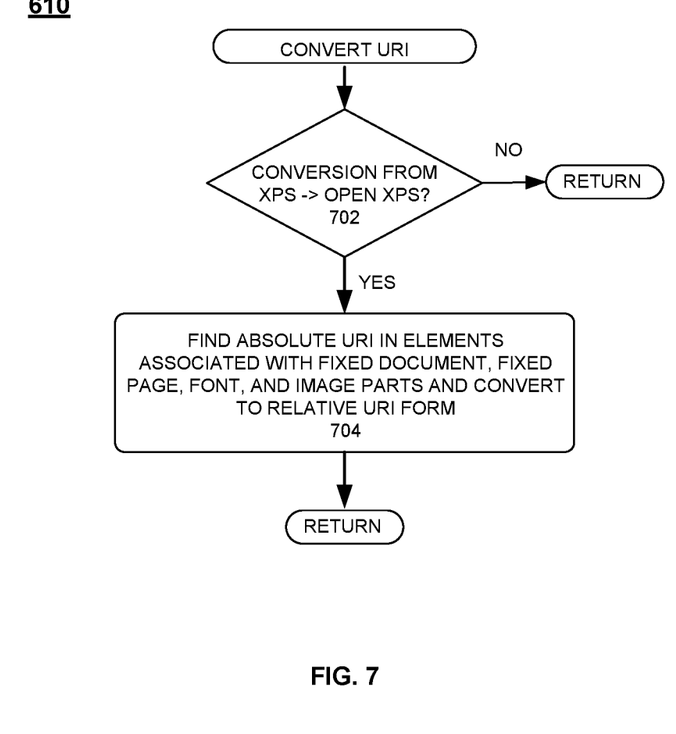
FIG. 7 is a flow chart illustrating an exemplary method for conversion of an URI.

Next, the conversion tool 102 converts an absolute URI for certain elements in certain parts to an equivalent relative URI in accordance with the OpenXPS Standard (block 610). Referring to FIG. 7, the conversion is only performed when converting from an XPS document to an OpenXPS document (block 702—yes). Otherwise (block 702—no), there is no need for the conversion since the XPS Specification supports both relative and absolute URI addresses. For each part listed in Table 5, the conversion tool 102 searches for the element referred to in Table 5 and checks the URI associated with that element (block 704).

For those URI values that are not in relative form, the conversion tool 102 converts the URI to relative form and replaces that value in the corresponding element (704). In converting from an absolute URI value to a relative URI value, the conversion tool 102 calculates the shortest path from the parent part in the package to the child part in the package. For example, if the URI value of the parent part is "/Documents/1/Pages/FixedPage.fpage" and the URI value of the child part is "/Documents/Resources/Images/image.bmp", then relative URI value is " . . . / . . . /Resources/Images/image.bmp." The conversion tool 102 parses the parent's URI value until a common folder is found or the package root is found. The character " . . . /" replaces the part of the child's URI value that is common and the rest of the child's URI value is added to the relative URI value.

TABLE 5

| Part | Elements having URIs to Check |
|---|---|
| FixedDocument | <DocumentReference> |
| Fixed Page | <Page Content> |
| Font URI | <Glyphs> |
| Image URI | <Image Brush> |

Figure 8:
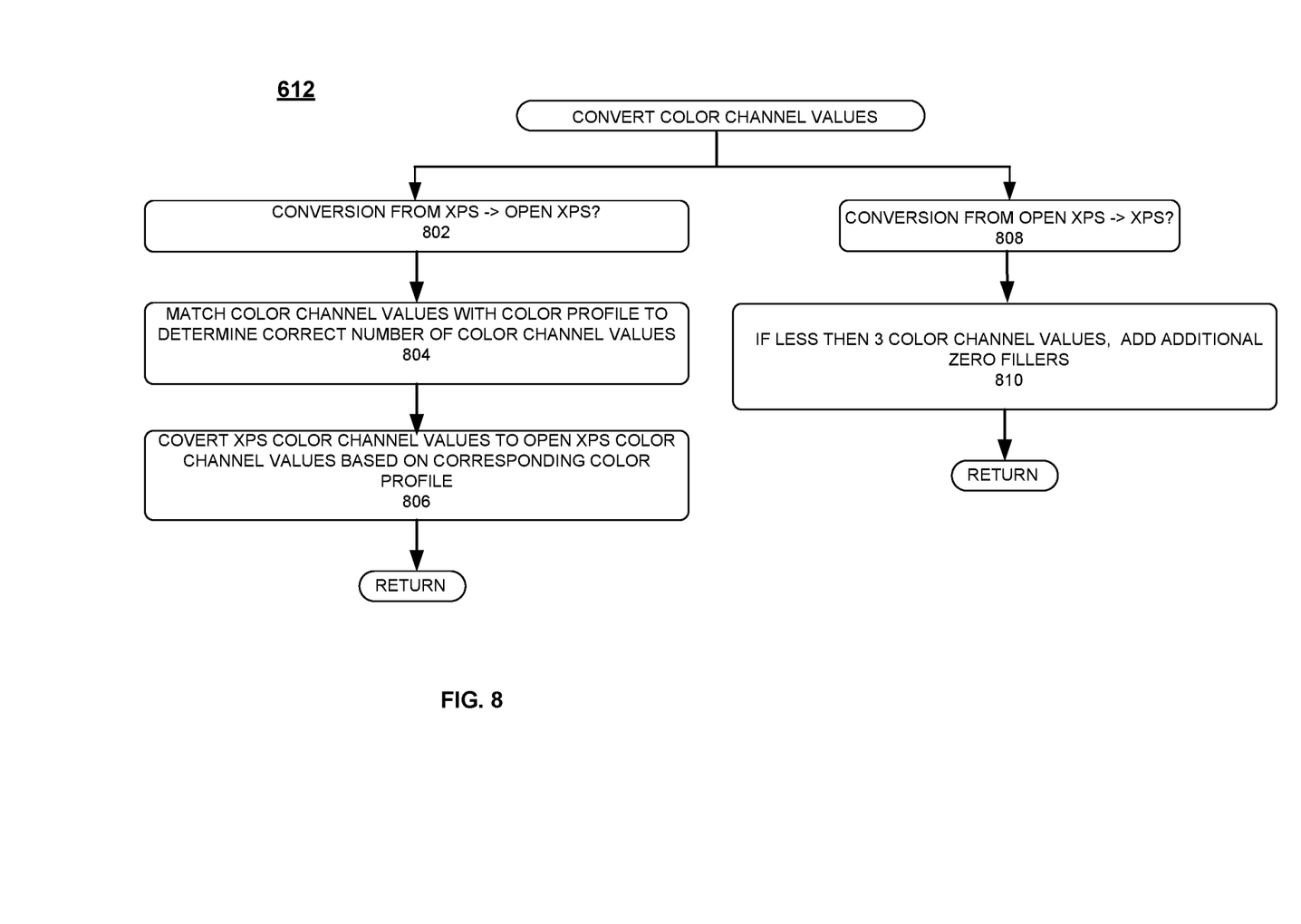
FIG. 8 is a flow chart illustrating conversion of color channel values.

Referring back to FIG. 6, the conversion tool 102 checks the color attributes using ICC color profiles (e.g., Color="ContextColor/Colors/channelprofile.icc 1.0, 0.8, 0, 0") and converts the color channel values if necessary (block 612). Referring to FIG. 8, when converting from an XPS document to an OpenXPS document (block 802), the conversion tool 102 matches the number of color channel values specified in the color attribute with the number of channel values needed for the specified color profile (e.g., .icc file) (block 804). The file header information in the specified color profile file contains the number of channel values needed for the specified color profile. If the number of color channel values specified in the color attribute differs from the number of channel values needed for the specified color profile, then the conversion tool 102 eliminates the zero fillers that do not correspond to a channel thereby converting the color attribute to the OpenXPS format (block 806).

When converting from an OpenXPS document to an XPS document (block 808), if there are less than three channel values specified in a color attribute, (e.g., Color="ContextColor/Colors/channelprofile.icc 1.0, 0.8, 1.5"), the conversion tool 102 adds additional zero fillers to the end of the channel value text string so that there are at least 3 channel color values (block 810).

Referring back to FIG. 3, the conversion tool 102 converts the format of image parts that are not supported by either format. XPS recognizes and supports the JPEG format (Joint Photographics Experts Group), the PNG format (Portable Network Graphics), TIFF format (Tagged Image File Format) and HD Photo image formats. By contrast, OpenXPS recognizes and supports the JPEG, PNG, TIFF, and JPEGXR (Joint Photographics Experts Group XR) image formats. The HD Photo image format is not supported by the OpenXPS Standard and the JPEGXR image format is not supported by the XPS Specification. When converting an XPS document to an OpenXPS document, the conversion tool converts each HD Photo image to a JPEGXR image format through an image conversion tool (block 308). In the case of converting an OpenXPS document to an XPS document, the conversion tool converts each JPEGXR image to a HD Photo image through an image conversion tool (block 308). In at least one embodiment, the Windows Image Converter may be used to facilitate these conversions although any available image converter that has the capability of converting an HD Photo image to an JPEGXR image and vice versa may also be used.

Create New Package

Referring back to FIG. 3, after all of the above-mentioned conversions have been made, a new package is created in the desired format. Each of the above-mentioned conversions generated a new part, instead of altering the existing part, and after all the conversions have been performed a new package is generated thereby completing the conversion (block 310). The new package may be generated using OPC application programming interfaces (APIs).

It should be noted that the methods illustrated herein may be representative of some or all of the operations executed by one or more embodiments described herein and that each method can include more or less operations than that which is described above. In addition, the sequence of the steps may be performed in alternate configurations for an intended implementation.

Operating Environment

Figure 9:
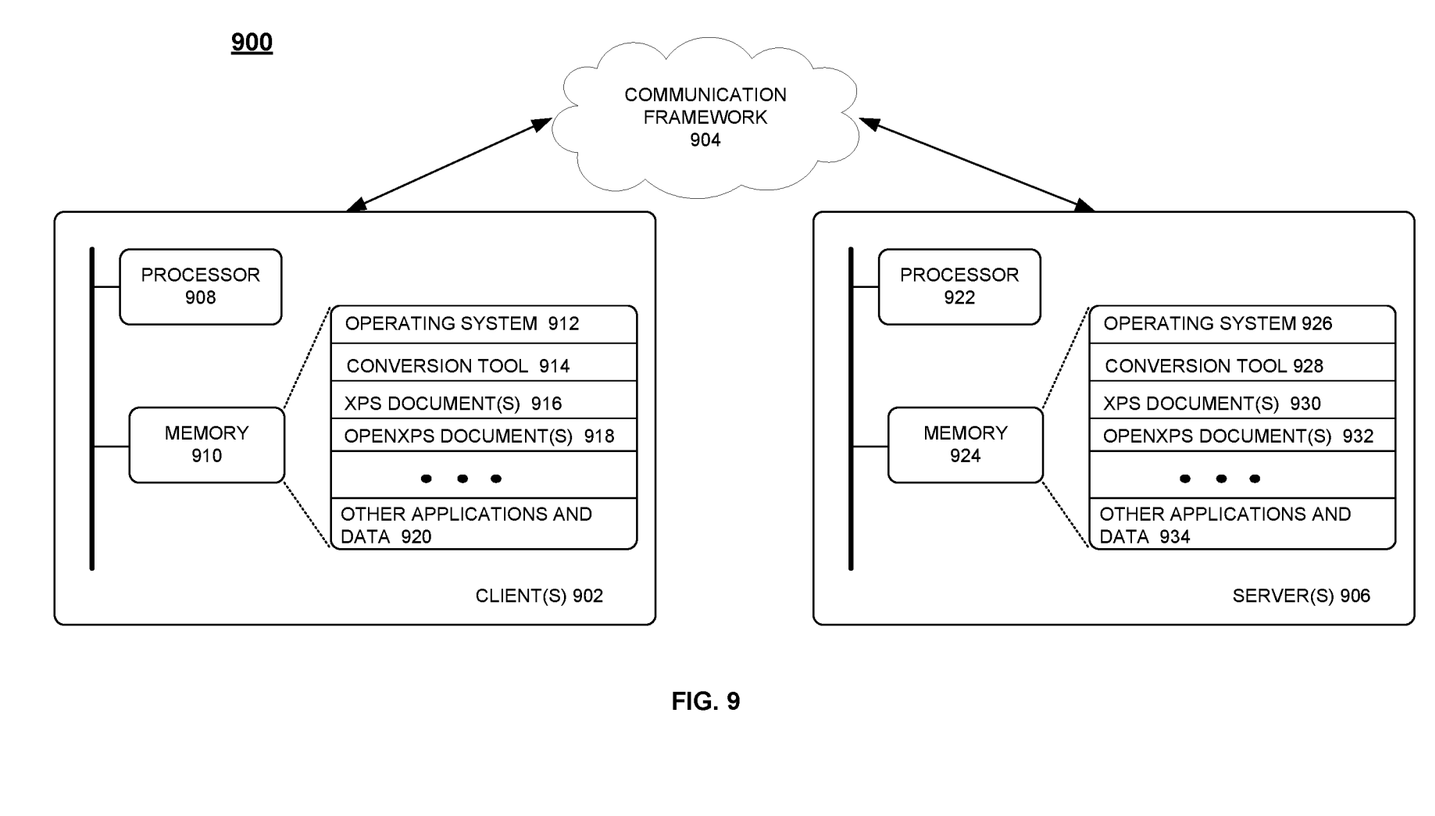
FIG. 9 is a block diagram illustrating an exemplary operating environment.

Referring now to FIG. 9, there is shown a schematic block diagram of an exemplary operating environment 900. The operating environment 900 may include one or more client(s) 902 in communication through a communications framework 904 with one or more server(s) 906. In an embodiment, a client 902 may be configured to contain one or more XPS documents 916 that may need to be converted into an OpenXPS document 918 and/or one or more OpenXPS documents 918 that may require conversion to an XPS document 916. A server 906 may receive requests from one or more clients 902 along with a package and may facilitate the conversion for the client 902. The server 906 may then provide the converted package, XPS document 916 or OpenXPS document 918, back to the client 902. In another embodiment, the conversion tool 102 may reside in the client 902 thereby enabling the client 902 to perform the intended conversion without the need for the server's involvement. In yet another embodiment, a server 906 may be configured to contain one or more XPS documents 930, one or more OpenXPS documents 932, and a conversion tool 928. The server 906 may perform an intended conversion without receiving requests from any clients 902.

A client 902 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 902 may also be embodied as a software module having instructions that execute in a single execution path, multiple concurrent execution paths (e.g., thread, process, etc.), or in any other manner.

A server 906 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 906 may also be embodied as a software module having instructions that execute in a single execution path, multiple concurrent execution paths (e.g., thread, process, etc.), or in any other manner.

The communications framework 904 facilitates communications between the client 902 and the server 906. The communications framework 904 may embody any type of communications medium, such as wired or wireless networks, utilizing any communication protocol.

A client 902 may have a processor 908 and a memory 910. The memory 910 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 910 may also include one or more external storage devices or remotely located storage devices. The memory 910 may contain instructions and data as follows:

an operating system 912;
a conversion tool 914;
one or more XPS documents 916;
one or more OpenXPS documents 918; and
various other applications and data 920.

A server 906 may have a processor 922 and a memory 924. The memory 924 may be any computer-readable storage media or computer-readable media that may store processor-executable instructions, procedures, applications, and data. It may be any type of memory device (e.g., random access memory, read-only memory, etc.), magnetic storage, volatile storage, non-volatile storage, optical storage, DVD, CD, floppy drive, disk drive, flash memory, and the like. The memory 924 may also include one or more external storage devices or remotely located storage devices. The memory 924 may contain processor-executable instructions and data as follows:

an operating system 926;
a conversion tool 928;
one or more XPS documents 930;
one or more OpenXPS documents 932; and
various other applications and data 934.

Conclusion

The foregoing description has described embodiments of a conversion tool that automatically converts an XPS document into an OpenXPS document and an OpenXPS document into an XPS document. The conversion tool provides an automatic and comprehensive technique to perform the conversion that is less prone to errors and more time efficient than a manual process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, an article of manufacture may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

The embodiments described herein refer to XPS documents and OpenXPS documents that adhere to a particular specification and standard. However, the embodiments are not limited to these specifications and standard and may be used in compatible specifications and standards, such as future versions of the specifications and standards of those recited herein. An XPS-compatible document is one that adheres substantially to the schema of the XPS version 1.0 Specification including, but not limited to, all versions and revisions of this specification, even though they may not be referred to using the term "XPS." Similarly, an OpenXPS-compatible document is one that adheres substantially to the schema of the OpenXPS version 1.0 Standard including, but not limited to, all versions and revisions of this standard, even though they may not be referred to using the term "OpenXPS."

What is claimed:

1. A computer-implemented method, the method comprising:
   receiving a first document that is configured as a first package that is formatted in accordance with a first syntax, wherein the first document includes at least one file, and wherein the first syntax is an XPS syntax or an OpenXPS syntax;
   identifying one or more elements in the at least one file that are formatted in the first syntax;
   converting the one or more elements into one or more converted elements that are formatted in a second syntax that is different than the first syntax;
   generating a second document that is configured as a second package that is formatted in accordance with the second syntax, the second package including the one or more converted elements that are formatted in the second syntax; and
   storing the second package.

2. The method of claim 1, wherein the first package and the second package contain data and resources needed to print an electronic document.

3. The method of claim 1, wherein the first package and the second package contain data and resources needed to render an electronic document.

4. The method of claim 1, wherein converting the one or more elements further comprises:
   searching for a Signature Definition part in the first package; and
   inserting a content type into the Signature Definition part of the second package.

5. The method of claim 1, wherein converting the one or more elements further comprises:
   searching for a Signature Definition part in the first package;
   deleting a content type associated with the Signature Definition part of the first package; and
   adding in a default context type to the Signature Definition part of the second package.

6. A device, comprising:
   at least one processor;
   at least one memory in communication with the at least one processor, the at least one memory having computer readable instructions stored thereupon that, when executed by the at least one processor, cause the device to:
   receive a first package that is formatted in accordance with a first syntax, wherein the first package includes at least one file, and wherein the first syntax is an XPS syntax or an OpenXPS syntax;
   identify one or more elements in the at least one file that are formatted in the first syntax;
   convert the one or more elements into one or more converted elements that are formatted in a second syntax that is different than the first syntax; and
   generate a second package that is formatted in accordance with the second syntax, the second package including the one or more converted elements that are formatted in the second syntax, and wherein the second syntax is the XPS syntax or the OpenXPS syntax.

7. The device of claim 6, wherein the first package is used to render or print a document.

8. The device of claim 6, wherein the one or more elements associate the first package with a restricted font file.

9. The device of claim 6, wherein the one or more elements associate a namespace associated with the first package with the at least one file.

10. The device of claim 6, wherein the one or more elements identify a relationship between the first package and an external resource.

11. The device of claim 6, wherein converting the one or more elements into the one or more converted elements comprises:
    changing a value associated with the one or more elements in the XPS syntax to a different value associated with the OpenXPS syntax.

12. The device of claim 6, wherein converting the one or more elements into the one or more converted elements comprises:
    changing a value associated with the one or more elements in the OpenXPS syntax to a different value associated with the XPS syntax.

13. The device of claim 6, wherein the one or more elements represent a namespace, a color channel value, or a universal resource identifier (URI).

14. The device of claim 6, wherein the first package and the second package utilize a common packaging requirement.

15. The device of claim 6, wherein the first package and the second package utilize a packaging requirement set forth in an Open Packaging Convention standard.

16. A system, comprising:
    at least one processor;
    at least one memory in communication with the at least one processor, the at least one memory having computer readable instructions stored thereupon that, when executed by the at least one processor, cause the device to:
    receive a first document that is configured as a first package with data and resources that are formatted in accordance with a first syntax, wherein the first syntax is an XPS syntax or an OpenXPS syntax, wherein the first document includes one or more files;
    convert at least one element in at least one of the one or more files from the first syntax into at least one converted element that is formatted in a second syntax;
    generate a second document that is configured as a second package with data and resources that are formatted in accordance with the second syntax; and
    store the second document.

17. The system of claim 16, wherein the at least one element represents a signature definition element associated with a digital signature associated with the first document.

18. The system of claim 16, wherein the at least one element represents a relationship between the first document and the one or more files.

19. The system of claim 16, wherein the at least one element represents a part-level relationship between a first element included in a first file of the first document and a second element included in a second file of a second document of the first document.

20. The system of claim 16, wherein the at least one element represents a relationship between the first document and an external resource.

\* \* \* \* \*